Inventors:
NORBERT BUCHNER, KLAUS DOMKE,
ROLF KÖHNLEIN & HELMUTH ZIMMERMANN
Edward S. Sachs ATT'Y

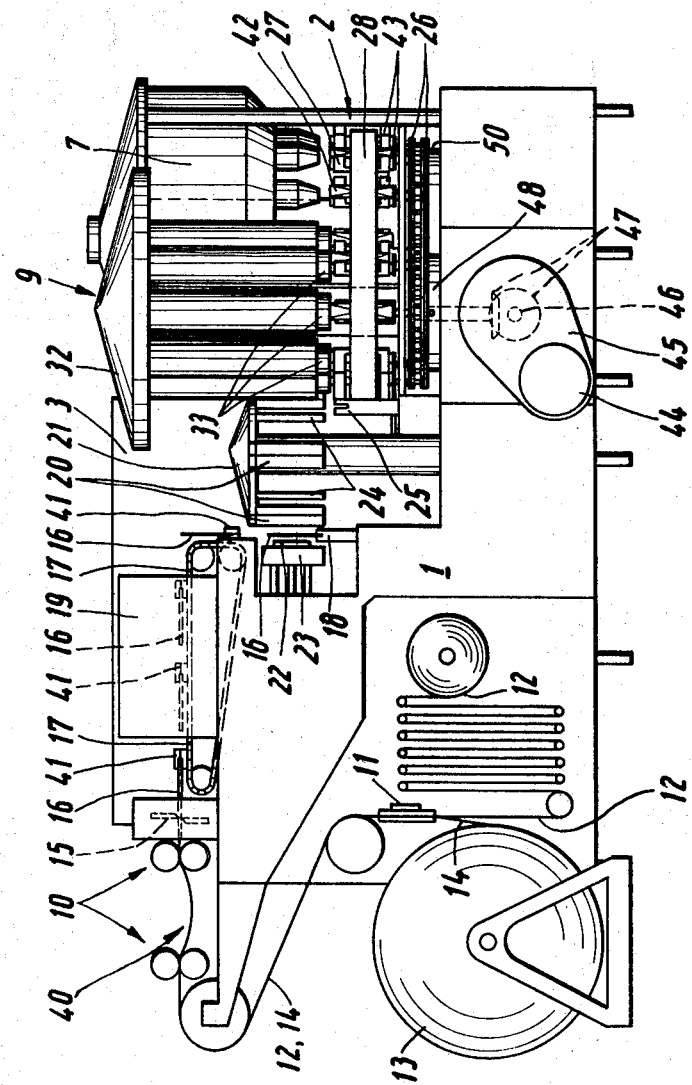

3,559,369
MACHINE FOR PRODUCING, FILLING, AND CLOSING PACKAGES

Norbert Buchner, Beutelsbach, Wurttemberg, Klaus Domke, Stuttgart-Weilimdorf, Rolf Kohnlein, Korntal, Wurttemberg, and Helmuth Zimmermann, Waiblingen, Wurttemberg, Germany, assignors to Fr. Hesser Maschinenfabrik A.G., Stuttgart, Bad Canstatt, Germany, a company
Filed Aug. 13, 1969, Ser. No. 849,791
Claims priority, application Germany, Aug. 16, 1968, 1,786,093
Int. Cl. B65b 5/02, 43/10
U.S. Cl. 53—183        10 Claims

ABSTRACT OF THE DISCLOSURE

An integrated packaging machine for producing and filling sleeve shaped containers, having work stations for cutting blanks from a web of packaging material, providing a seal, forming the containers around mandrels, welding equipment for securing a cover to one end, filling the container and weld securing a cover to the other end.

---

The invention relates to a machine for producing, filling, and closing packages of the type having a sleeve-shaped body and a cover at each end.

In the prior art, machines are already known in which the container body is produced from a continuously-fed multilayer web of packing material, in such a manner that the web is formed continuously into tubular shape which is then cut into sleeves of a predetermined length.

However, the conventional method of fabrication has the disadvantage that when the pieces of the tubular material are separated a high degree of surface pressure occurs at the location of the cut, which causes kinks and delaminations in the packing material and may lead, ultimately, to premature spoilage. Particularly in the case of stiff packing material fabrication of the tube has to be carried out over a relatively long distance, in order to prevent wrinkling of the packing material, and this again requires a machine of considerable structural length. Another difficulty with such conventional machines resides in properly guiding the cut pieces of the container tube so that the longitudinal seam thereof comes to rest accurately in the location provided therefor in the cover-welding device. This is not always readily accomplished.

It is therefore the main object of the present invention to provide a packaging machine which obviates these disadvantages and which can be constructed to occupy a relatively small space, has a high output, and ensures careful handling of the packing material for producing kink-free packages even with stiff packing materials.

An aspect of the present invention resides in the provision of a packaging machine which includes a packing-material feed station followed by a shear for separating the blanks, a heating device to heat the longitudinal edges of the packing-material blanks, a plurality of vertically arranged mandrels attached to an intermittently rotating wheel for receiving and forming the blanks, folding and pressing tools operatively associated with the forming mandrels, a stationary tube withdrawal device operatively associated with the forming-mandrel wheel, a constantly revolving endless conveyor for carrying buckets having a side and a top opening for receiving the tubular or sleeve-shaped blanks after withdrawal from the forming mandrels, a conventional cover-attaching device arranged following the latter station having a turntable driven by engagement with the conveyor, followed by a device for turning the one sidedly closed container bodies 180° about their transverse axes, a package filling device of a conventional drum-shaped design driven by engagement with the conveyor, followed by a cover-attaching device arranged along the conveyor, and a second cover-welding device also in meshing engagement with the conveyor.

Another aspect of the present invention resides in the provision of a packaging machine of the type described above in which a device for fabricating the covers from a web of packing material is associated with the machine and is connected to the two cover-attaching devices through conveyor channels. The arrangement being such that the main conveying direction of this fabricating device runs at a right angle to the conveyor device on the machine and thus parallel to the feed line of the packing material to the machine.

Another aspect of the present invention resides in that the buckets on the machine conveyor arrangement are provided with special dogs which project into the region of the removal device associated with the forming mandrels. The dogs guide the removed packaging blanks or bodies into the conveyor buckets in conjunction with a stationary guide rail arranged along the conveyor device at a progressively decreasing distance from the buckets.

For a better understanding of the present invention, together with other and further objects thereof, reference is had to the following description taken in connection with the accompanying drawings, and its scope will be pointed out in the appended claims.

In the drawing:

FIG. 2 is a side elevation of the machine shown in FIG. 1.

Figure 1:
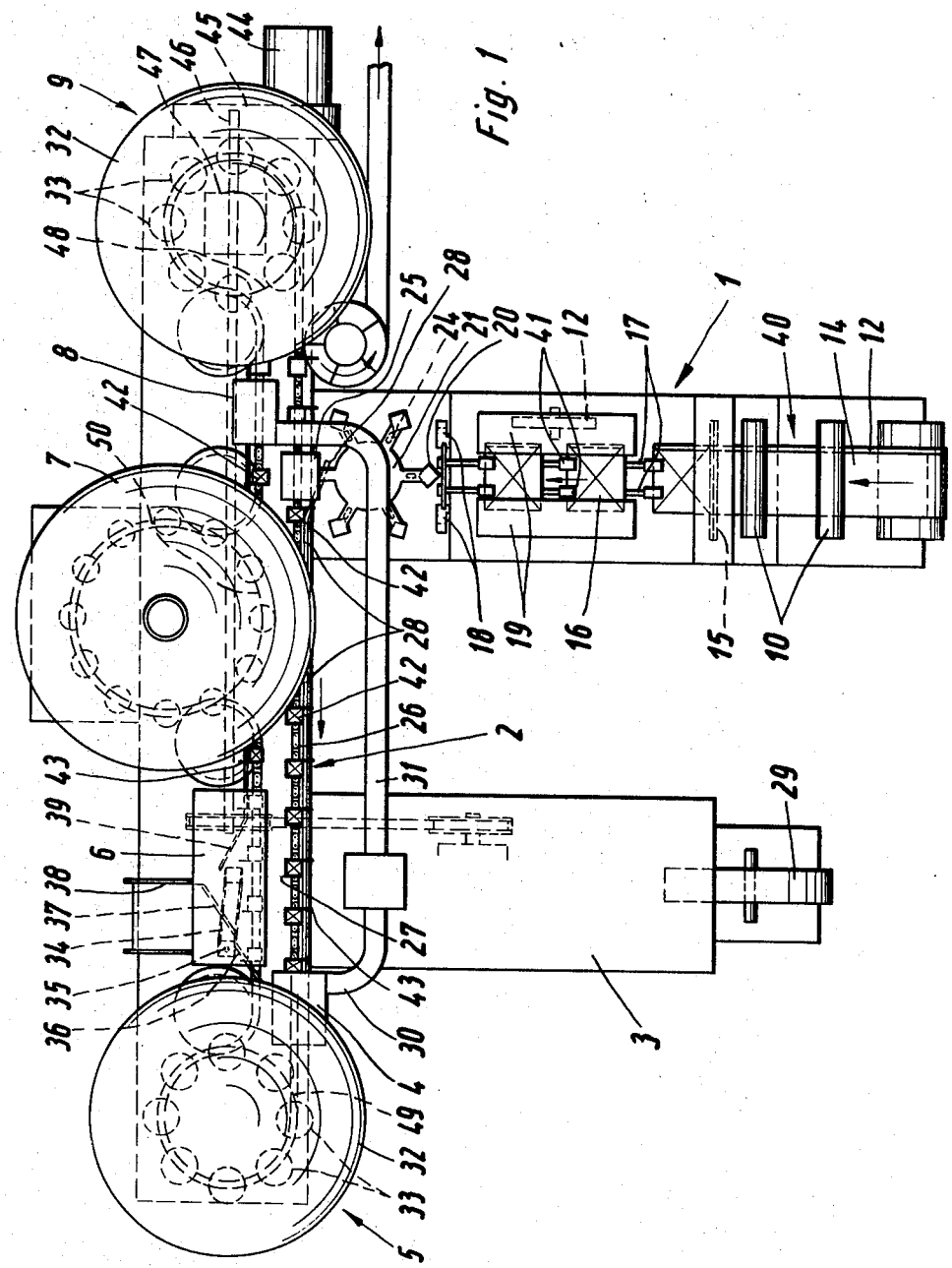
FIG. 1 is a plan view of the machine according to the invention.

Referring now to the drawings, there is shown a packaging machine which includes a fabricating device 1 for making sleeve-shaped packaging container bodies 42, a continuously revolving conveyor arrangement 2 arranged transversely to device 1, a cover-producing device 3 extending parallel to device 1 and transverse to conveyor 2, a first cover-attaching device 4, a first cover-welding device 5 arranged adjacent to the latter, a sleeve turner 6—to which one cover has been attached—for turning the blank 180° about its transverse axis, a container filling device 7 known per se located adjacent to the conveyor and past the container body fabricating stations, a second cover-attaching device 8 and a second cover-welding device 9 for finalizing the packaging of the now filled container.

The individual stations or components of the machine are constructed and arranged as follows.

The apparatus 1 for fabricating the container blanks or bodies from a web 14 comprises pull rollers 10 for withdrawing and feeding forward the web 14, and an applicator 11 arranged between a storage roll 13 and the rollers 10 to apply a sealing strip 12 to form the longitudinal seam of the web. A shear 15 is mounted in a forward position, i.e. after the rollers 10, for cutting the web 14 of packing material into separate blanks 16. Adjacently disposed are conveyor devices 17 and 18 for feeding the blanks 16 stepwise, and heating devices 19 known per se are arranged along conveyor device 17. A wheel 21 provided with forming mandrels 20 and adapted to rotate stepwise is secured immediately adjacent to conveyor device 18, folding and pressing tools 22, 23, 24, of a type known per se, and means 25 of a type known per se for removing the blanks or bodies 16 are arranged around mandrels 20.

The continuously revolving conveyor device 2 comprises a chain 26 rotating in a horizontal plane and U-shaped conveyor buckets 27 attached thereto and open at the top and side, and guide rails 28 arranged along the path of travel of the open sides of conveyor buckets 27.

The cover-producing device 3 is constructed in a conventional manner and processes by deep drawing an endless web of thermoplastic-coated packing material which is pulled from a storage roll 29, and made into covers having conventional U-shaped end folds.

Two cover-attaching devices 4 and 8 are connected to cover-producing device 3 by conveyor ducts 30, 31. As an alternative to the cover-producing device 3, it is of course possible to arrange, forward of cover-attaching devices 4, 8, stacking devices for pre-fabricated covers.

Each cover-welding device 5, 9 comprises a continuously rotating retaining member 32 and welding heads 33 adapted for moving vertically up and down on member 32. The welding heads 33 provide, in a conventional manner, jaws heated by infra-red radiators, not shown, which are brought into operative position by means of springs, as well as a matching tool arranged between the jaws. These jaws may be retracted from operating position by means of, for example, a pneumatically activated work cylinder which engages, through rollers, articulatedly mounted levers provided with wedge surfaces, and carrying the jaws.

Turning device 6 is provided with a duct 34 beginning at the side of, and above, the path of travel of conveyor buckets 27, running upwards into an arc having an angle of deflection of 180°, finally extending vertically downwards and terminating at the side of the path of travel of conveyor buckets 27; the device or station also includes a blast-air nozzle 35 arranged below duct 34 and connected to a compressed-air line through a control valve, not shown; a guide rail 36 arranged ahead of the blast-air nozzle 35 and crossing the path of travel of conveyor buckets 27, a guide rail 37 starting below the start of duct 34 and extending from conveyor device 2 to a chute 38, and an additional guide rail 39 which is arranged in progressively decreasing proximity to conveyor buckets 27 in the direction of conveying.

The method of operation of the machine is as follows:

The packing-material pull-off device 10 withdraws web 14 of packing material continuously from the storage roll 13. Along the path to packing-material pull-off device 10, a strip 12 of thermo-plastically-coated sealing material is applied, in a manner already known, around one longitudinal edge of endless web 14 of the packing material, and is sealed thereto. A storage tube 40 is made from this web 14 of the packing material. Predetermined lengths are drawn stepwise from the storage tube and are inserted into grips 41 in conveyor device 17. After the grips are closed, a blank 16 is cut off web 14 by means of shear 15.

The blank 16 is then passed stepwise along heating devices 19, in such a manner that the thermoplastic coating of the blank is heated along its longitudinal edges. The heated blank 16 is now passed, by means of second conveyor arrangement 18, to an activated forming mandrel 20 and is pressed against the forming mandrel by pressing tool 22 and is then folded around it, in known fashion, by means of folding tools 23, in such a manner that the two heated longitudinal edges of blank 16 overlap. These edges, one of which is enclosed in sealing strip 12, are then pressed together, by means of pressing tool 24, into a lapped seam, thus producing a sleeve-shaped container body 42.

With the aid of a known removal device 25, these bodies 42 are withdrawn from forming mandrels 20, thus reaching the path of travel of conveyor buckets 27. Secured to the back of conveyor buckets 27, as an extension thereof, are one or more dogs 43 which engage the bodies 42 now removed from forming mandrels 20 and carry them along. The distance between guide rail 28 and the conveyor buckets is progressively reduced, and the rail 28 pushes the container bodies picked up by dogs 43 into the conveyor buckets.

The conveyor buckets transfer the container bodies 42 consecutively to the first cover-attaching device or station 4. This device places covers on the upwardly directed end, of the bodies in such a manner that the U-shaped edge fold of the cover embraces the edge of the body.

The edge fold of the cover is then welded to the container body 42 by means of cover-welding device 5. This is accomplished by having the matching-tool lowered into the cover, after which the heated jaws are pressed by means of the springs, towards the matching-tool, in such a manner that the thermoplastic coatings applied to the container bodies and covers are heated and joined together in known fashion by the pressure exerted upon them.

After leaving the first cover-attaching device 5, the container bodies, now closed at one end, are forced out of conveyor buckets 27 by guide rail 36. The container bodies pass over the blast-air nozzle 35. The air issuing therefrom blows each container body 42 into duct 34, whence it drops, with its closed end down, into the path of travel of dogs 43. These pick up the container bodies 42, carry them along, with the bodies being again returned into conveyor buckets 27 by guide rail 36.

The design of turning device 6 already described has the advantage that the container bodies without a welded-on cover are not blown by the air issuing from blast-air nozzle 35 into duct 34, and therefore do not reach the filling device. The container bodies 42 not blown into duct 34 may then be removed from the machine by guide rail 37 and chute 38.

Conveyor device 2 carries the container bodies 42 closed at one end under filling device 7 which fills them in the conventional manner.

The filled packages are then passed to second cover-attaching device 8 and second cover-welding device 9 and are completely closed in the manner already described.

The second cover-welding device 9 is driven by a motor 44 through a transmission 45, a shaft 46, and another transmission 47. First cover-welding device 5 and filling device 7 are driven by means of a chain sprocket 48 attached to second cover-welding device 9 and by chain 26 of conveyor device 2. To this end, driven devices 5 and 7 are provided with chain sprockets 49 and 50 carrying chain 26. The cover-producing device is also driven by shaft 46.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A machine for producing a sleeve-like container body with a cover at each end, and for filling and closing the container body, comprising in combination: a plurality of work performing stations arranged along the fabricating and filling path of the container and container blank including, means for supplying packing material blanks; heating means for heating the longitudinal edges of said blanks, a plurality of vertically arranged forming mandrels attached to a stepwise rotating wheel and adapted for receiving said blanks, blank folding and pressing tools operatively associated with said mandrels; container body removal means associated with the said forming mandrels; a revolving endless conveyor means having buckets for receiving the sleeve-like bodies removed from the forming mandrels; means for attaching a cover at one end of the sleeve-like body; welding means for securing said cover; turning means for turning the container bodies substantially 180° about their transverse axes; filling means for filling said container bodies with a product; second cover-attaching means for securing a cover to the other end of the filled container body; and second cover-welding means for securing the second cover.

2. A machine according to claim 1, wherein each of said cover-welding means is in engagement with and driven by said conveyor means.

3. A machine according to claim 2, wherein said filling means is in engagement with and driven by said conveyor means.

4. A machine according to claim 1, and means for producing covers from a web of packing material associated with the machine, the last mentioned means being connected to the two cover-attaching means, and conveyor ducts interposed between the cover-producing means and said cover-attaching means.

5. A machine according to claim 4, wherein the direction of movement of the cover-producing means is at a right angle to said conveyor means and parallel to the path of the packing-material feed means.

6. A machine according to claim 1, wherein said conveyor buckets are provided with dogs projecting into the region of said removal means associated with said forming mandrels, and a stationary guide rail is arranged along said conveyor device for cooperating with said dogs.

7. A machine according to claim 6, wherein said turning means comprises a guide rail crossing the path of travel of said conveyor buckets; a blast-air nozzle arranged adjacent to and below the bottom of said buckets; a duct, extending from above the nozzle and describing an arc of substantially 180° and having openings in the bottom, and terminating above the path of travel of the dogs; and a guide rail arranged along the path of travel of said dogs, said guide rail extending progressively closer towards said conveyor buckets in the direction of the conveying.

8. A machine according to claim 6, wherein the distance between said guide rail and said conveyor buckets decreases progressively in the direction of the conveyor travel, said guide rail being effective to push said container bodies into said conveyor buckets.

9. A machine according to claim 7, wherein an additional guide rail is provided, extending from the vicinity of the blast-air nozzle, and a chute extends away from the machine with said guide rail projecting into said chute.

10. A machine according to claim 1, wherein the cover-welding means has the configuration of a turntable, and said filling means has the configuration of a drum.

References Cited

UNITED STATES PATENTS

| 2,697,313 | 12/1954 | Wilcox | 53—29 |
| 3,331,186 | 7/1967 | Braun | 53—186 |

FOREIGN PATENTS

| 939,253 | 10/1963 | Great Britain | 53—29 |

THERON E. CONDON, Primary Examiner

E. F. DESMOND, Assistant Examiner

U.S. Cl. X.R.

93—39.2